United States Patent [19]

Stönner et al.

[11] 3,970,432

[45] July 20, 1976

[54] MULTISTAGE VERTICAL EXTRACTOR FOR LIQUID-LIQUID COUNTERFLOW EXTRACTION

[75] Inventors: Hans-Martin Stönner, Schwalbach; Berthold Scholz, Oberursel; Rainer Hartmann, Frankfurt am Main, all of Germany

[73] Assignee: Metallgesellschaft Aktiengesellschaft, Frankfurt am Main, Germany

[22] Filed: Mar. 6, 1974

[21] Appl. No.: 448,510

[30] Foreign Application Priority Data

Mar. 8, 1973  Germany............................ 2311358

[52] U.S. Cl. ....................... 23/270.5 T; 196/14.52; 23/267 MS
[51] Int. Cl.² ........................................ B01D 11/04
[58] Field of Search................ 23/267 MS, 270.5 T, 23/270 R; 196/14, 52

[56] References Cited
UNITED STATES PATENTS

| 2,164,193 | 6/1939 | McKittrick | 23/270.5 T |
| 2,201,550 | 5/1940 | Van Dijch | 23/267 MS |
| 3,325,255 | 6/1967 | Treybal | 23/267 MS |
| 3,433,599 | 3/1969 | Mehner | 23/267 MS |

FOREIGN PATENTS OR APPLICATIONS

| 2,052,410 | 4/1972 | Germany | 23/270.5 T |
| 962,888 | 4/1963 | United Kingdom | 23/270.5 T |
| 699,133 | 10/1953 | United Kingdom | 23/270.5 T |

Primary Examiner—Stephen J. Emery
Attorney, Agent, or Firm—Karl F. Ross; Herbert Dubno

[57] ABSTRACT

A liquid-liquid counterflow extractor has a plurality of stacked stages each of which is provided with a mixer and a separator, the stages being traversed in succession by an upwardly flowing relatively low-density (light) phase and downwardly by the relatively high-density (heavy) phase. The separations of adjacent stages have lateral outlets which can be selectively connected to the inlets of a pump which can serve to displace one of the phases from one stage to another or to circulate a phase within one stage.

1 Claim, 1 Drawing Figure

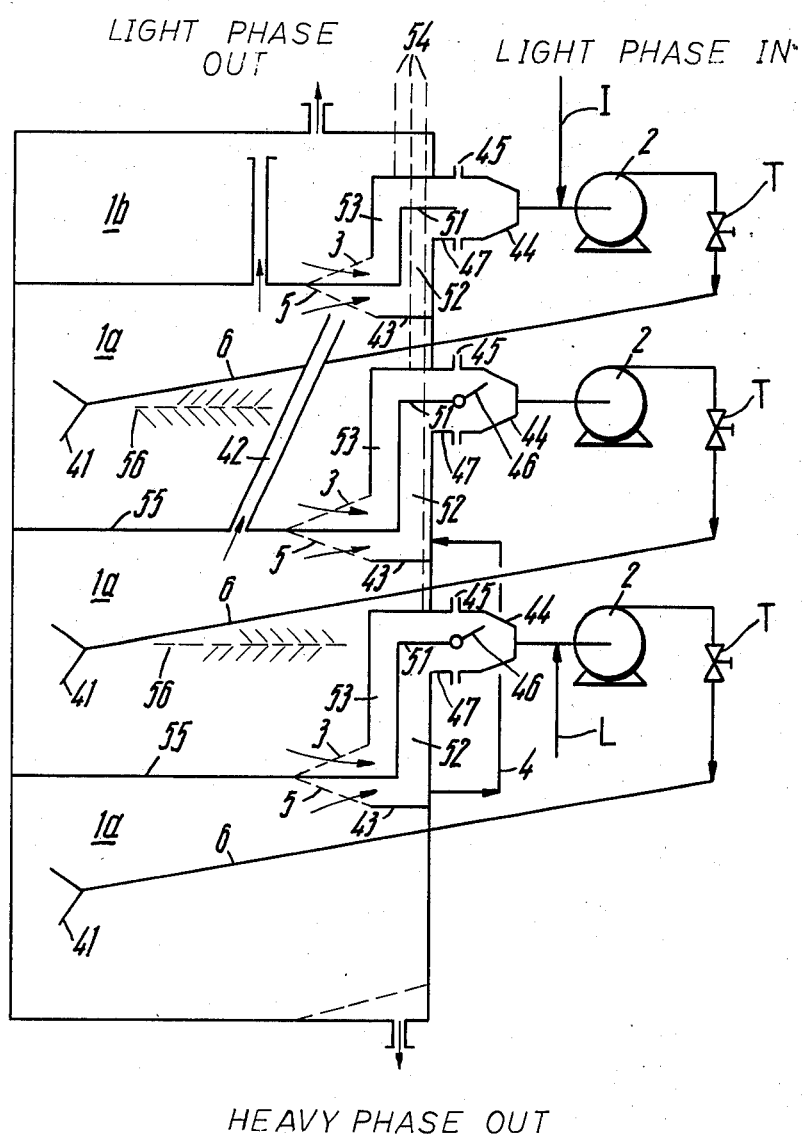

MULTISTAGE VERTICAL EXTRACTOR FOR LIQUID-LIQUID COUNTERFLOW EXTRACTION

FIELD OF THE INVENTION

Our present invention relates to a multistage vertical extractor for liquid-liquid counterflow extraction and, more particularly, to an extractor of the described type provided with pumps, separator and mixers for intimately contacting a downwardly moving relatively dense or heavy liquid phase and a relatively less dense or light liquid phase traversing the system in the upward direction.

BACKGROUND OF THE INVENTION

Liquid-liquid extractors or contactors are known in a variety of configurations and are designed to bring about intimate contact between a relatively dense or "heavy" liquid phase and a relatively low-density or light liquid phase. The two liquids, which are generally mutually insoluble and immiscible, are brought into contact with one another in a plurality of stages in order to effect material transfer between them. For example, refinery or chemical-plant liquids may be extracted with selective solvents designed to pick up one or another component from the mixture for subsequent isolation of this component or purification of the mixture from which the component is removed. The system is used in a wide variety of chemical processes and is of a configuration which is generally independent of the particular solvents or liquid phases to be employed.

It has been proposed heretofore to provide such extractors with a plurality of vertically stacked stages which are traversed by the heavy or relatively high-density phase in a downward direction and by the light or relatively low-density phase in an upward direction. Each stage may be provided with mixers for bringing about intimate contact of the two phases, with separators for separating the two phases from one another and means for inducing the flow of one or the other phase through the particular stage.

In one prior-art system for the continuous extraction of one liquid with another, a plurality of chambers are provided in vertically superposed relationship and are provided with separating compartments of rectangular configuration in horizontal cross-section. The pumps, overflow devices and sight glasses are arranged at juxtaposed end faces of the chambers. The extractor allows control of the layers of each phase and the layer of phase mixture between them with the aid of the overflows so that regardless of the throughput of the device the various surfaces of the phase and phase mixtures remain at the same levels.

The advantage of this system, which uses overflow devices to maintain the levels of the several phases, i.e. the relatively dense, the relatively light and mixed phases, is that the same levels are obtained where the phase ratio is approximately constant. However, this system has the disadvantage that the phase ratio cannot readily be changed and that a gas specific is generally formed on each state above the liquid.

A multistage extractor for liquid-liquid extraction as described has been proposed in which the light liquid is recirculated in each stage with the heavy liquid flowing generally from the top to the bottom and the light liquid traversing the system generally from the bottom to the top. Each of the superimposed stages includes a mixing chamber, a separating chamber and a mixing pump for transferring the liquid from the mixing chamber to the separating chamber of the same stage. Each mixing chamber is disposed above the separating chamber of the same stage but on the level of the separating chamber of the next higher stage and the intakes of the mixing pumps are disposed between passages connecting the upper portion of each mixing chamber to the upper portion of the mixing chamber of the next lower stage, and connecting conduits which communicate between the upper portion of each mixing chamber and the upper portion of the separating chamber of the same stage. Corresponding conduits of two superimposed stages are arranged with mirror symmetry.

An extractor of the latter type has been found to be highly stable under light loads but has the disadvantage that the position or level of the phase boundary is fixed and that with higher loading (i.e. greater throughput) the phase boundary tends to move in an uncontrollable manner.

A liquid-liquid extractor has also been described in which each stage comprises a mixer and a separator and, in each stage, part of one phase can be recirculated through the mixer and the separator. In the latter extractor, the separator of adjacent stages and lateral outlets which are disposed on both sides of the intervening bottom and formed the heavy phase can be collected on the bottom while the light phase can be collected beneath the bottom for separate withdrawal and supply to a mixing pump.

While this system has the advantage that the phase boundary can be adjusted as desired through the full height of each stage, it has the disadvantage that termination of operation of the extractor causes the heavy phases to flow toward the lower stages and the light phases to be displaced upwardly to occupy the space formerly occupied by the heavy phase. Thus, with the extractor in a charged condition but out of operation, the entire volume of the heavy phase is found in the lower stages and the entire volume of the light phase has been displaced to the upper stages. As a consequence, starting up again is a time-consuming process requiring development of new phase boundaries at each stage.

OBJECTS OF THE INVENTION

It is the principal object of the present invention to provide a liquid-liquid extractor which is of relatively simple construction and readily controllable in operation whereby the aforementioned disadvantages can be obviated.

It is another object of the invention to provide a liquid-liquid extractor which permits the phase boundaries to be controllably varied in height and level and also permits rapid startup of the system.

SUMMARY OF THE INVENTION

The liquid-liquid extractor of the present invention is, as will be apparent hereinafter, designed to insure that, when the apparatus is shut down, a phase equilibrium is maintained in each stage.

In conventional extractors provided with dynamic automatic control, disturbance of the equilibrium of material transferred is not desired in many applications. As has been noted, it is difficult to start a conventional extractor when it is important to prevent the appearance of the component to be extracted in a high concentration of the raffinate because of subsequent processes in which the latter may be involved. For example, where the component is toxic and must be discarded in any significant concentration, it is important that the phase separation be maintained in each stage. Waste liquids produced by the degasification or gasification of coal must be maintained free from concentrations of phenol of even the order of parts per million for ecological reasons and hence dephenolization extraction processes cannot tolerate start-up conditions which may result in higher concentrations in the waste water.

We are able to accomplish this result, i.e. that of startup of the extractor without discharge of high concentrations of the extracted component in the effluent, in an extractor which comprises a pair of separate ducts or tubes which conduct the heavy and light phases to a discharge-limiting edge for one of the two phases and thereafter to the intake conduit of a mixing pump formed with a hinged valve.

According to another feature of the invention, a respective mixing pump is provided for each of the stages and is disposed at the level of the discharge-limiting edge and is provided with a hinged valve arrangements as described. The distance between the bottom of the particular stage and the discharge limiting edge is at least equal to the thickness of the layer of the phase to be retained in the particular stage.

Advantageously, the discharge-limiting edge is spaced from the bottom by the same distance as the apparent interface which may be established during operation.

In more general terms, therefore, a monostage vertical extractor for liquid-liquid extraction with a heavy liquid phase and a light liquid phase comprises means including a plurality of vertically spaced bottoms define a multiplicity of vertical supposed separation compartments each forming one of the stages and adapted to receive a layer of the heavy phase upon each bottom and a layer of the light phase above the layer of the heavy phase (and below the bottom of the next higher stage) and defining an apparent phase interface therewith. Means is provided to define a pair of radial liquid outlets opening above and below each of the bottoms and respectively communicating with the layer of the heavy phase of one stage above the bottom and with the layer of the light phase of the next lower stage below the bottom. The respective mixing pump is associated with each pair of lateral liquid outlets and has an intake side and a discharge side, the discharge side of each pump communicating with one of the separation compartments into which an outlet of the respective pairs opens. A respective discharge-limiting edge is formed at each pump intake side and is positioned to an intermediate level between bottoms defining the other compartment of the associated pair of outlets. Separate ducts individual to the outlets of each pair communicate with the respective pump intake side on opposite sides of the respective discharge-limiting edge while a hinged valve flap is provided on each discharge-limiting edge for controlling the relative flows of liquid from the outlets of each pair to the respective pump intake side.

BRIEF DESCRIPTION OF THE DRAWING

The above and other objects, features and advantages of the present invention will become more readily apparent from the following description, reference being made to the accompanying drawing, the sole FIGURE of which is a diagrammatic vertical section through an extractor according to the invention.

SPECIFIC DESCRIPTION

The drawing shows a liquid-liquid extractor according to the present invention provided with three stages and means for the recirculation of the light or low-density liquid phase. The same principles are applicable to any desired number of stage and to recirculation of the heavy phase.

In the drawing, we show a system in which each stage comprises a separator 1a above a bottom 55 and above the mixing compartment which is formed below the separator compartment and above the bottom. Above the three stages, there is provided a reseparator 1b.

Each stage has a mixing pump 2 and is formed with an outlet 3 for the heavy or high-density phase, a conduit 4 for transferring the light or low-density phase from each stage to the next upper stage, outlets 5 from which the light phase passes from each separator 1b and mixture distributors 41 which open into the separators.

Internal conduits 42 transfer the light phase from one stage to another, e.g. from the separator of the second stage to the separator of the third stage, while outlet weirs 43 permit overflow from each separator.

The suction side 44 of each pump 2 is shown to communicate with a conduit system provided with hinged valves 46, the suction side 44 being connected to the extraction column by flanges 45. Connecting pipes 47 have mating flanges and extend laterally from the column while discharge-limiting edges 51 are provided for the heavy phase. Ducts 52 conduct the light phase from each separator to the conduit 47 while ducts 53 communicate with the heavy phase spaces of each stage. Vents 54, shown diagrammatically in broken lines, are provided for each conduit 47 and the apparent interfaces in each stage are represented diagrammatically at 56.

In operation, the mixture of phases to be separated flows from the mixing pump 2 through the conduit 6 which is provided with a throttle valve T to the mixture distributor 41 into the separator 1a above each bottom 55 and separates therein into a light phase and a heavy phase having an interface represented generally at 56.

The heavy phase flows through the phase outlet 3 of the respective stage and the duct 53 over the discharge-limiting edge or weir 51 to the one side of the hinged valve or flap 46. The light phase of the next lower stage passes through the phase outlet 5 and the duct 52 to the other side of the same hinged valve or flap. When the two stages flow past the hinged valve 46, they are united at the suction side of the mixing pump. The heavy liquid is fed into the extractor at the suction side 44 of the mixing pump 2 of the uppermost stage, i.e. at I.

The heavy liquid thus flows through the upper mixing pump 2 and through the pipe 6 of the uppermost stage into the uppermost separator 1a where it is separated from its mixture with the light phase and flows through the outlet 3 and duct 53 past the edge 51 and the hinged valve or flap 46 to the intermediate stage of the three stage system shown in the drawing. The process repeats with each lower stage and there is a generally upward flow of the light fluid and a generally downward flow of the heavy phase.

The phase boundary in the lowermost stage can be controlled by any conventional level-control means of the light liquid, and is supplied to the inlet side 44 of the lowest mixing pump, i.e. at I. The light phase is here mixed with the downcoming heavy phase and the light phase is permitted to flow over the conduit 4 from one stage to the next in a generally upward direction or, depending upon the position of the flap 46, is recirculated through the pump. The degree of recirculation is controlled by the throttling valve T in conduit 6 and the position of the flap 46 of the associated pump.

In each pump, the heavy phase is intimately mixed with the light phase and the resulting mixture is introduced through the distributor 41 into a separator 1a so that the light phase in part flows back to the same mixing pump and in part passes into the next stage via conduit 4. In each successive stage, a portion of the light phase is thus recirculated and a portion can be passed upwardly, e.g. by the internal conduit 42 or internal conduit 43.

The outlet of the light-phase conduit 4, 42, 43 in each stage terminates at a point in the next higher stage at which a portion of the light phase transferred from stage to stage immediately flows to the mixing pump of the next stage together with the light phase of that stage for recirculation.

As a result, when the mixing pumps operate at a rate which exceeds the rate at which they are supplied from the outside, the streams which are transferred, from stage to stage will in all cases meet in the mixing pump and cannot flow through the stages without intimate mixing. This extra discharge rate, i.e. the difference between external supply and pumping capacity, corresponds precisely to the recirculation rate of the relevant phase, i.e. the heavy phase in the case of the extractor shown.

When external supplies of liquid to the extractor are terminated, that portion of the heavy phase which is below the limiting edge 57 will remain after separation has been completed. There is thus no downward flow of the heavy phase from stage to stage and, when operation of the mixing pumps is resumed after a standstill, there will be no substantial or disturbing changes in the disposition of the several stages.

After a prolonged standstill, the mixing pumps may be started before external supplies of the liquid phase is resumed without resulting in a disturbance of the equilibrium of the material transfer within the extractor.

It will be apparent that the extractor will function similarly when the heavy phase is recirculated at each stage.

The duct 53 are vented at 54 to permit the initial forming and to allow for continuous discharge of any gases which may be generated. All of the venting conduits extend upwardly and may be connected to a common duct above the extractor.

Relating the extractor of the drawing to the general description presented earlier, it will be seen that the bottoms 55 are vertically spaced and define a multiplicity of vertically superposed separation compartments 1a, each forming one of the stages and being adapted to receive an upper light phase, a lower heavy phase, and an apparent interface 56 between them.

A pair of relative liquid outlets 3, 5 opens above and below each of the bottoms and a respective mixing pump 2 is associated with each pair of liquid outlets 3, 5. The intake side 44 of each pump is provided with a discharge-limiting edge 51 at an intermediate level between the bottom 55 of one compartment (the compartment from which the heavy phase is withdrawn in the case of light-phase recirculation) while the discharge side of the pump communicates with the separation compartment of the other outlet (in this case outlet 5) of the respective pair. The separate ducts (upcomers) 53 and 52 are individual to the outlets 3 and 5 of each pair and communicate with the respective pump intake side 44 on opposite sides of the respective discharge-limiting edge. The latter has a hinged valve flap 46 for controlling the relative flows of liquid from the outlets 3, 5 of each pair to the respective pump-intake side.

We claim:
1. A multistage vertical extractor for liquid-liquid extraction with a heavy liquid phase and a light liquid phase, said extractor comprising:

means including a plurality of vertically spaced bottoms for defining a multiplicity of vertically superposed separation compartments, each forming a respective one of the stages and adapted to receive a layer of the heavy phase upon each bottom and a layer of the light phase above the layer of the heavy phase and defining an apparent interface therewith;

means defining a pair of horizontal lateral liquid outlets opening above and below each of said bottoms and directly adjacent same, each pair of outlets respectively communicating with the layer of said heavy phase of one stage above the respective bottom and with the layer of said light phase of the next lower stage below the respective bottom;

a respective mixing pump associated with each of said pairs of lateral liquid outlets and having an intake side and a discharge side, said discharge side of each pump communicating with one of the separation compartments into which an outlet of the respective pair opens, each such pump having its intake side disposed at a level intermediate the bottoms of a separation column immediately above the separation column into which its discharge side opens, said level corresponding to the level of the interface of the separation column intermediate the bottoms of which the respective pump is disposed;

respective pairs of upcomers each rising from one of the lateral liquid outlets of a respective pair substantially to said level;

respective pairs of lateral ducts extending horizontally from and communicating with respective upcomers of a respective pair, each pair of ducts merging into a common chamber at the level of an intake side of a respective pump, said ducts of each pair having a common wall at the latter level defining a respective discharge edge, each of said chambers communicating with a respective intake side of the respective pump at the said level thereof;

a respective hinged valve flap on each discharge edge in the respective chamber at the respective intermediate level for controlling the relative flows of liquid from the outlets of each pair to the respective pump intake side, each discharge edge being disposed at a distance above the bottom of a respective compartment at least equal to the height of a phase to be retained therein upon termination of operation of said pumps.

* * * * *